Sept. 11, 1928.

M. B. HENRY ET AL 1,684,271

BELT FASTENER

Filed July 8, 1927

M. B. Henry
AND A. L. Cadenhead,
INVENTORS

BY Victor J. Evans

ATTORNEY

Patented Sept. 11, 1928.

1,684,271

UNITED STATES PATENT OFFICE.

MACK B. HENRY AND ARNOLD L. CADENHEAD, OF NORPHLET, ARKANSAS.

BELT FASTENER.

Application filed July 8, 1927. Serial No. 204,333.

This invention relates to belt fasteners, and its general object is to provide a fastener for securing the ends of a machine belt and the like together in a quick and expeditious manner and the greater the tension of the belt, the greater will be the gripping action of the fastener when associated with the ends, with the result the fastener will hold the ends together regardless of the pulling thereon.

A further object of the invention is to provide a belt fastener of the character as above set forth, that is extremely simple in construction and is inexpensive to manufacture.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which.

Figure 1:
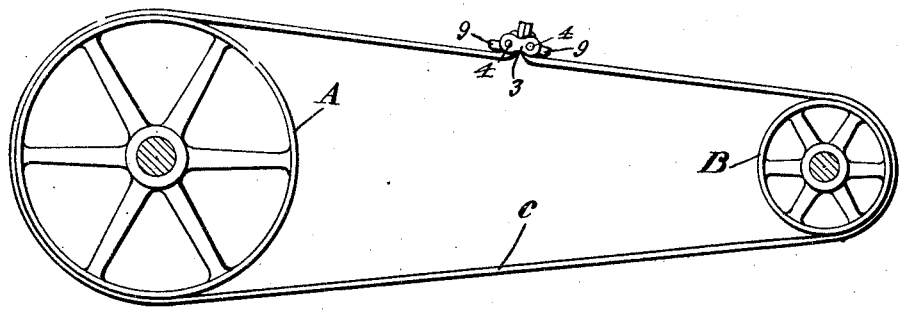
Figure 1 is a side elevation of a belt associated with pulleys and having its ends secured together through the instrumentality of the fastener which forms the subject matter of the present invention.

Referring to the drawings in detail the letters A and B indicate pulleys and C a belt which as shown in Figure 1 has its ends secured together by our invention which includes a pair of similar shape cam members 1 and 2 which are pivotally secured for co-operation between a pair of links 3 through the instrumentality of headed pivot pins 4.

Figure 2:
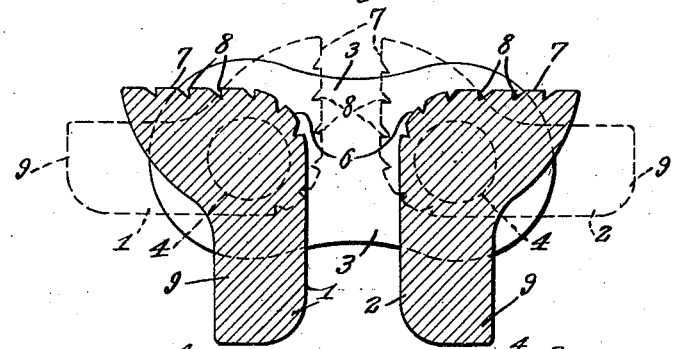
Figure 2 is a view partly in section and illustrating the operating parts of our belt fastener in normal position in full lines and operative position in dotted lines.
Figure 3:
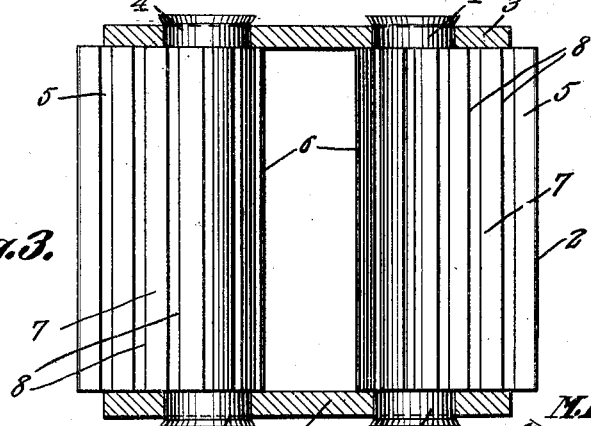
Figure 3 is a top plan view of the belt fastener per se showing the same disposed in open position.

The cam members are formed with cooperating cam faces 5 which are substantially arcuate shape as at 6 for a portion of their length and terminate in straight portions 7 as best shown in Figure 2 of the drawings.

The respective portions 6 and 7 of the cam members are provided with longitudinally arranged spaced parallel substantially cross sectional V-shaped grooves having inclined walls disposed in the same direction in each member so as to provide teeth 8 which are adapted to grip the ends of the belt as suggested in Figure 1 for retaining said ends in fixed contacting engagement. The cam members are further provided with reduced finger engaging portions 9 which are adapted for operating the said members when placing the ends of the belt between the cam faces 5 as will be apparent.

From the above description and disclosure of the drawings, it will be obvious that we have provided a belt fastener that may be applied to the respective ends of a belt in a quick and expeditious manner and by arranging the cam faces 5 in contacting engagement with the outer faces of the ends of the belt, as shown in Figure 1, it will be apparent that the teeth 8 will grip the ends when the belt is drawn taut and the gripping action will be increased as the tautness of the belt is increased.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

A belt fastener of the character described comprising cam members, pivot pins therefor, links pivotally receiving said pivot pins and securing said cam members for cooperative association, longitudinally toothed cam faces included in said cam members and being provided with arcuate portions merging into straight portions and reduced finger engaging portions formed with said cam members.

In testimony whereof we affix our signatures.

MACK B. HENRY.
ARNOLD L. CADENHEAD.